United States Patent [19]

Hoover

[11] Patent Number: 4,953,502
[45] Date of Patent: Sep. 4, 1990

[54] THREE-DIMENSIONAL MAZE PET TOY

[76] Inventor: Judith L. Hoover, 3108 Killian Rd., Uniontown, Ohio 44685

[21] Appl. No.: 410,256

[22] Filed: Sep. 21, 1989

[51] Int. Cl.$^5$ .............................................. A01K 15/00
[52] U.S. Cl. ........................................ 119/29; 272/19; 273/153 R
[58] Field of Search ............. 119/29; 273/153 R, 113; 272/19; D30/160

[56] References Cited

U.S. PATENT DOCUMENTS

| D. 265,139 | 6/1982 | Salvato | D30/160 |
|---|---|---|---|
| 2,261,804 | 11/1941 | Hall | 372/153 R |
| 3,260,236 | 7/1966 | Jones | 119/29 |
| 3,406,971 | 10/1968 | Koff | 273/153 R |
| 3,516,389 | 6/1970 | Meyer | 119/29 |
| 3,857,364 | 12/1974 | Miller, Jr. | 119/29 |
| 4,301,766 | 11/1981 | Accone | 119/29 |
| 4,347,807 | 9/1982 | Reich | 119/29 |
| 4,497,279 | 2/1985 | Bell | 119/29 |
| 4,677,938 | 7/1987 | Tominaga | 119/29 |
| 4,727,825 | 3/1988 | Houghton | 119/29 |
| 4,743,023 | 5/1988 | Collier | 273/153 R |
| 4,822,047 | 4/1989 | Treer | 273/153 R |
| 4,824,098 | 4/1989 | Huang | 272/19 |

*Primary Examiner*—Paul J. Hirsch
*Attorney, Agent, or Firm*—Oldham & Oldham Co.

[57] ABSTRACT

A three-dimensional changeable maze for small animals in box, knockdown, and modular form, which utilizes (a) interlocking and interchangeable grid elements, (b) interchangeable or rotatable planar surfaces, and (c) rotatable modules in modular form to vary the maze routes and adjust the level of complexity.

17 Claims, 3 Drawing Sheets

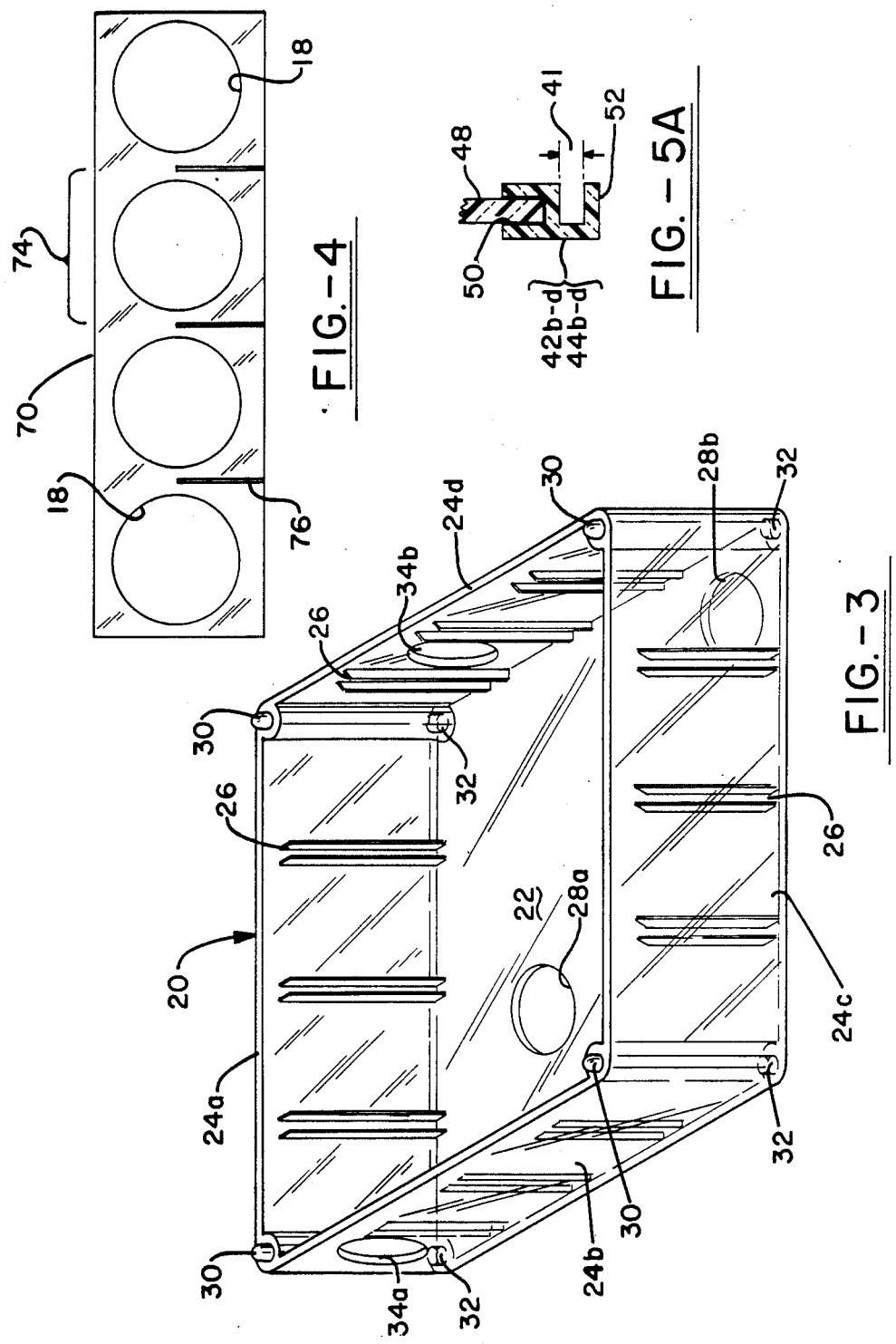

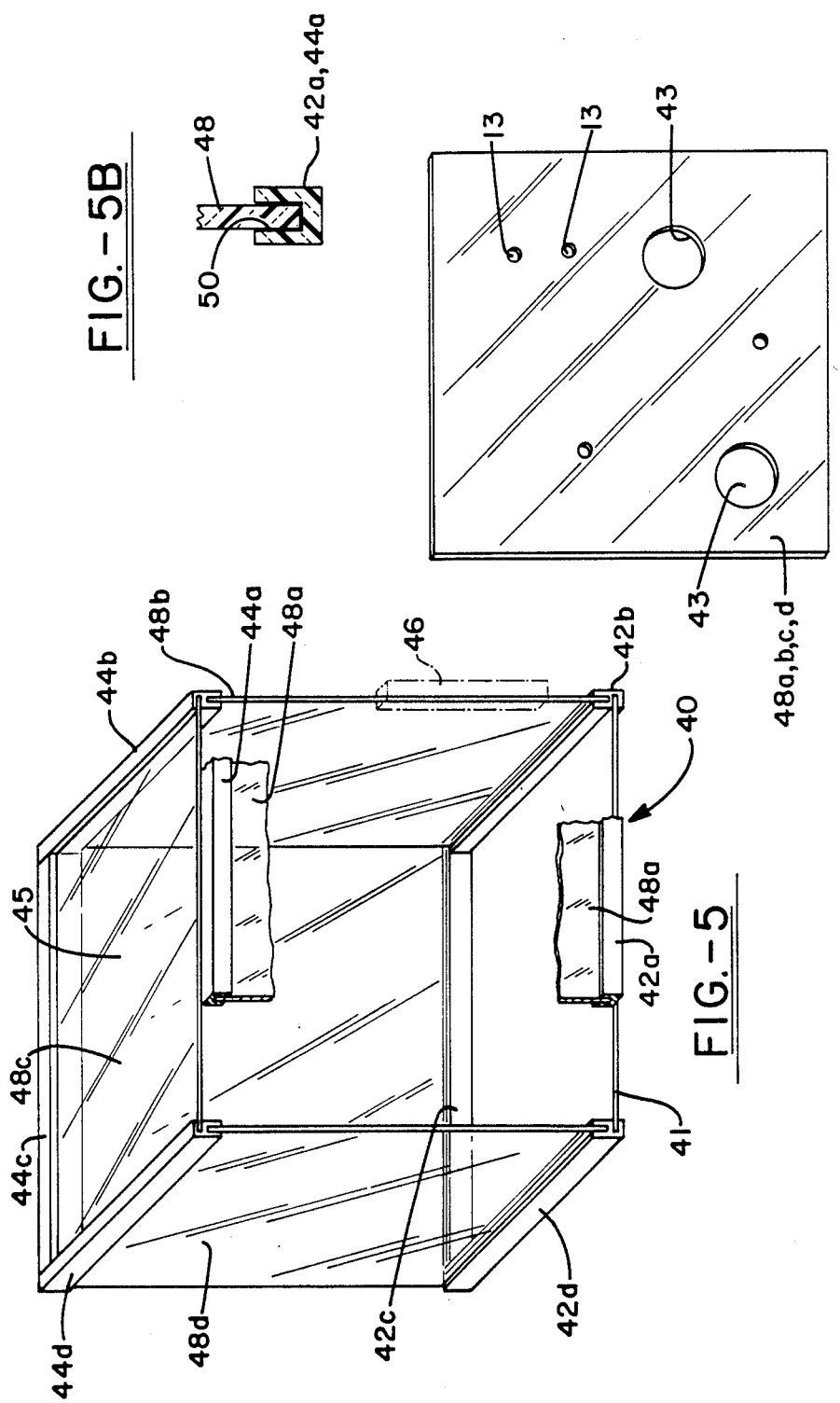

THREE-DIMENSIONAL MAZE PET TOY

TECHNICAL FIELD

The present invention relates to a pet toy maze for small animals (hamster, gerbil, mouse, or other small animal), specifically a three-dimensional changeable maze with a plurality of compartments and levels through which an animal can travel, and which may contain or support bedding, food, and other toys. The routes through the maze can be changed by (a) interchanging the grid elements, (b) interchanging or rotating the planar surfaces, and (c) by rotating the modules in the modular form. Any reasonably necessary degree of flexibility can be obtained without any additional elements. Such a maze provides human entertainment while observing the animal explore said compartments contained within the maze structure.

BACKGROUND OF THE INVENTION

Mazes or labyrinths, in general, have been known for an indeterminable number of years. A maze has been used to contain persons, conceal objects and the like. More commonly today, the maze is used as a form of entertainment and challenge for the participant with the objective being to maneuver oneself or an object from beginning to end as quickly as possible.

Traditionally, mazes were two-dimensional allowing movement forward, backward or laterally. However, three-dimensional mazes have become popular as amusement devices. One such U.S. Patent, U.S. Pat. No. 2,261,804, to Hall discloses a three-dimensional closed container in which a plurality of contiguous cubical shapes form the maze structure. Apertures in the walls of the cubicles form an irregular passage through which human interaction is required to maneuver an inanimate object, often a small ball. While the Hall Patent is a three-dimensional maze, such a maze would not serve any purpose without human interaction. More importantly, while the maze routes may be chosen and limited initially, the closed containment structure prevents the user from routinely changing them. Additionally, its closed structure would permit neither the easy introduction of small animals, nor the ability to easily clean the structure regularly.

Another three-dimensional labyrinth, U.S. Pat. No. 4,824,098 to Huang, discloses a three-dimensional maze game which employs interlocking septa and level plates inside a modular containment structure or stacked casings. However, even though the interior is accessible, the invention employs dumbbells for limiting the maze routes. Even though the septa may be randomly perforated, although shown totally perforated, this additional element is used and nothing suggests the interchangeability of the septa. In fact, this type of change could be troublesome in view of the separate casings and plates. Certainly, the act of interchanging the analogous grid elements of the present invention would provide any reasonably necessary degree of flexibility. Moreover, the level plates which Huang employs have holes 'equally spaced and evenly distributed over the whole plate' so that, in this case, there is without question no means for changing maze routes by interchangeability or rotation, and thus, the dumbbells are relied upon. Again, sufficient flexibility is derived with the planar surfaces and modules of the present invention via the more efficient means. Additionally, some grid elements are left out for animal living space.

Six additional patents disclose relevant animal structures:

U.S. Pat. No. 3,260,236 to Jones discloses a two-dimensional maze with no provisions for flexibility. While admirably designed for employing inexpensive material, namely coated cardboard, it is capable of disassembly, and in view of these characteristics, a number of features could prove to be troublesome. The creases and tabs are subject to wear and breakage and the slots in the floor could collect foreign material.

U.S. Pat. No. 3,516,389 to Meyer discloses a modular two-dimensional maze employing trenches in base plates for receiving wall panels and allowing for change of routes. However, the empty trenches will accumulate waste and influence animal travel. Moreover, many parts, namely hinges, clips, and extruded strip are necessary for assembly.

U.S. Pat. No. 3,857,364 to Miller discloses a modular maze for small animals which accommodates change of maze routes. Again, however, many elements are employed, namely, grooved posts, pegs, a perforated floor, and ramps. These must be individually assembled and disassembled and will collect waste.

U.S. Pat. No. 4,347,807 to Reich discloses a cat condominium which uniquely uses carpeting to make it a "hinged" collapsible structure, but the maze concept is not well represented in that there is only one compartment per level and the design is fixed.

U.S. Pat. No. D265,139 to Salvato discloses a design for a cat playground which is essentially a closed container which has a limited number of openings. However, the design is fixed, cannot be disassembled for cleaning, and does not use any repetition of structure for a manufacturing advantage.

U.S. Pat. No. 4,677,938 to Tominaga discloses a unique vertical maze currently on the market. However, it is dependent on a cage for completion; that is, it cannot stand alone. Other limitations are that it fits only one size of cage and does not employ a means for changing routes and thereby encouraging human interaction.

Also on the market for small animals are interconnecting plastic tubes. While such a concept is unlimited in the number of possible variations, it can become costly, and require substantially more space for equivalent complexity. It is also more difficult to clean and interconnecting sections can accidentally come apart.

The present maze structure combines the concepts of mazes as puzzles and mazes used for scientific study to form a three-dimensional maze structure which serves to amuse and provide living space for an animal and provide a source of entertainment for humans through observation. This invention offers several advantages over its predecessors. Primarily, the use of (a) interchangeable grid elements, (b) interchangeable or rotatable planar surfaces, and (c) rotatable modules in modular form allow for a reasonable degree of flexibility with a minimum number of parts which further serves to facilitate cleaning and minimize assembly time. At the same time, manufacturing cost is minimized through the repetition of parts. All the above-cited patents either lack a means for change or require extra parts. Also, the structure occupies a minimal amount of space for the complexity. It may be used alone, inside of a pet cage, or as a cage extension. Inside a pet cage, the maze structure creates more usable floor space by using levels and by supporting a toy or food dish on top. Leaving out grid elements can provide living space. In a large enough embodiment, planar surfaces without any apertures at all could be used to house animals separately. When used as a cage extension with the tube system, the maze would connect with said tubes via a tube connector which is well known in the art. In this form, there would be limited access through one or two connecting apertures and the containment structure would include a top. When used alone as a toy, it would again have a top and the entrance/exit apertures covered by any conventional means.

SUMMARY OF THE INVENTION

The present invention, generally stated, provides a three-dimensional changeable maze for small animals which has a number of compartments on a plurality of levels through which a small animal may travel, and which may contain or support bedding material, food, or other toys.

In one general embodiment the containment structure has an essentially cubical shape and is made of a transparent sheet or molded material to permit human observation. The interlocking grid elements and planar surfaces, made of a material similar to that of the containment structure, can be combined to form a variety of compartments on any number of levels. Such grid elements and planar surfaces have any number of holes such that when combined with one another permit the animal to travel between compartments and/or levels. Several variations of this embodiment utilize a containment structure which is alternately a rigid box-type structure, a modular assembly, or a knockdown version of the same structure.

It is an object of this present invention to provide a three-dimensional maze toy for small animals such that the use of the interlocking and interchangeable or rotatable pieces used in combination provides a variety of different maze routes which may vary in complexity and difficulty for the animal.

It is also an object of this present invention to provide a three-dimensional maze toy for small animals which creates additional living space and can accommodate bedding, food and toys.

It is also an object of this present invention to provide a three-dimensional maze toy for small animals such that the openness of the containment structure and the ability to break down the grids into flat pieces facilitates cleaning.

It is also an object of this present invention to provide a three-dimensional maze toy for small animals that may be used alone as a pet toy, as a cage extension or inside an existing cage.

It is also an object of this present invention to provide a three-dimensional maze toy for small animals such that the simplicity, design and the repetition of pieces (grid elements, planar surfaces and modular units) lends economy in manufacturing.

It is also an object of this present invention to provide a three-dimensional maze toy for small animals which, because of its design, provides human entertainment and aesthetic appeal. Human interaction may be used to structure maze routes, place rewards, and adjust the level of difficulty. The geometric symmetry of the design presents an appealing appearance.

These and other objects and advantages of the present invention are achieved by a three-dimensional maze for small animals which comprises a containment structure with at least one open end and at least one aperture of a size as to permit the entrance and exit of small animals; a plurality of maze elements encased in said containment structure, said maze elements further comprising a plurality of interchangeable grid elements, each grid element containing one or more apertures of a size as to permit movement by a small animal through the containment structure; and a plurality of interchangeable or rotatable planar surfaces separating adjacent maze elements.

BRIEF DESCRIPTION OF THE DRAWINGS

FIG. 3 is a perspective view of one modular unit of a three-dimensional maze for small animals, with the grid elements removed for illustration purposes, showing another embodiment of the present invention.

FIG. 4 is a front view of a grid element.

FIG. 5 is a perspective view of a knockdown model of a three-dimensional maze for small animals illustrating still another embodiment of the present invention. One side of the top and bottom rim pieces have been omitted for purposes of illustration.

FIG. 5A is a transverse cross-sectional view of three sides of the top and bottom rim piece of the framework used to secure the planar surfaces together for the formation of a knockdown containment structure.

FIG. 5B is a transverse cross-sectional view of the fourth side of the top and bottom rim piece of the framework used to secure the planar surfaces together for the formation of a knockdown containment structure.

FIG. 5C is a perspective view of one planar surface, a plurality of which are secured by a framework to form a knockdown containment structure.

DETAILED DESCRIPTION OF THE PREFERRED EMBODIMENT

The descriptions to follow are based on preferred embodiments for the rigid box, knockdown, and modular versions of the three-dimensional maze for small animals.

Figure 2:
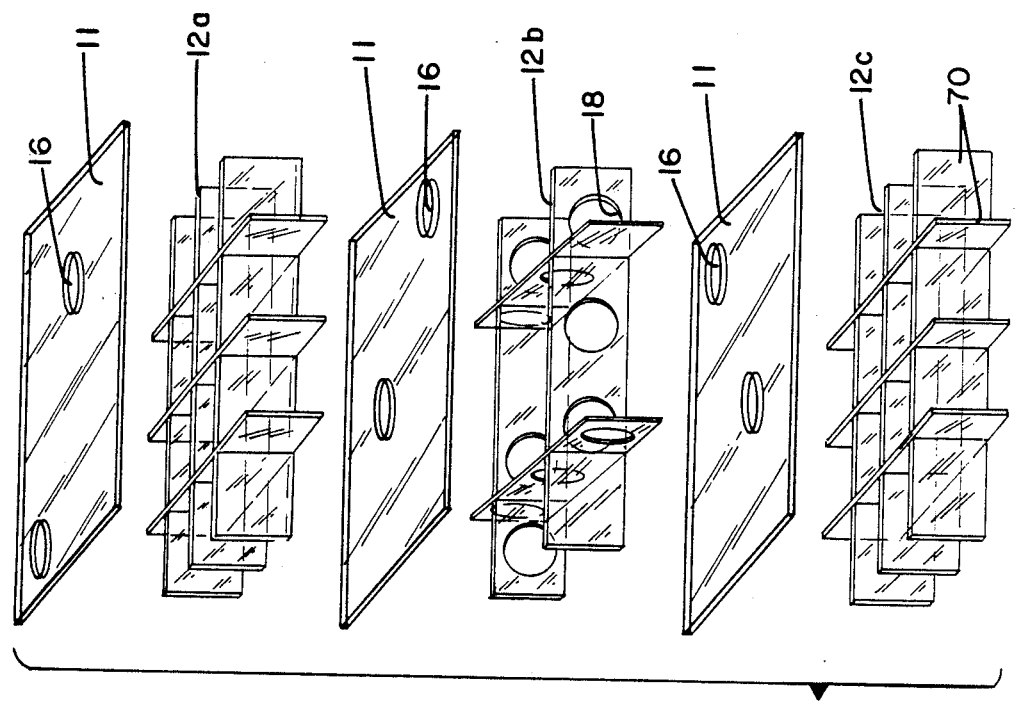
FIG. 2 is an exploded view of the assembly of one embodiment of a three-dimensional maze for small animals which is contained within the containment structure, illustrated in FIG. 1. The apertures have been omitted from maze elements 12a and 12c for purposes of clarity and illustration.
Figure 1:
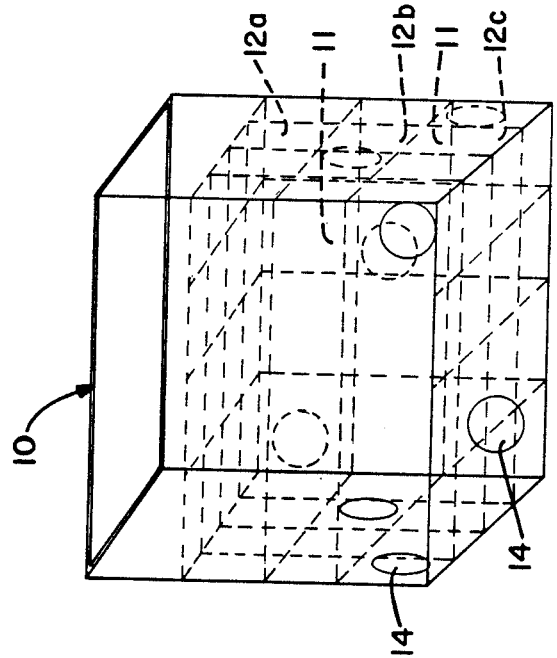
FIG. 1 is a perspective view of the containment structure of a three-dimensional maze for small animals, illustrating one embodiment of the present invention.

FIGS. 1 and 2 show an exploded view of a three-dimensional maze for small animals, using a box-type structure as a containment structure 10. The containment structure 10, the planar surfaces 11 and the maze elements 12a, 12b, and 12c are conventionally manufactured from a rigid or molded sheet material such as glass or a thermoplastic material (including but not limited to: polyvinyl chloride, polystyrene, polypropylene, methyl methacrylate and copolymers thereof). A suitable material is poly-methyl methacrylate, known in the art and sold commercially as Plexiglas$^R$. The preferred thickness of the sheet material is generally one-sixteenth to one-eighth inch, but is dependent on the weight of the animal using the maze and can readily be selected by a person skilled in the art. The containment structure 10 is essentially a hollow box, closed at one end. The box, shown here as an essentially cubical shape, could be manufactured in any number of geometric shapes.

The apertures 14 in the containment structure 10 permit access in and out of the maze by small animals (hamster, gerbil, mouse, etc.). The apertures may vary in number and position and are shown here as round in shape, but could essentially be cut in any geometric pattern. These apertures could be sealed off selectively using any conventional means known in the art.

The maze elements, 12a–c of FIG. 2 are composed of a series of grid elements 70. The grid elements 70 as illustrated in FIG. 4 are composed of a material similar to that used in the containment structure and planar surfaces described above. The preferred embodiment shows grid elements 70 as essentially rectangular in shape with each one essentially divided into sections 74 by a plurality of slots 76 cut along one longitudinal surface. The slots have a width essentially equal to the thickness of a corresponding grid element 70 and a length approximately equal to one-half the height of the grid element. One set of grid elements 70 is aligned such that these grid elements 70 are parallel to one another with all of the slots 76 directed upward. A second set of parallel aligned grid elements with slots 76 directed downward is interlocked with the first set of grid elements 70 to form essentially right angles with one another. A preferred embodiment shows these grid elements 70 such that any single grid element can be used with the slots 76 directed upward or downward. These grid elements have apertures 18 which are essentially the same size and shape as apertures 14. Such apertures 18 may be located in any one or more sections of grid element 70. The apertures 18 permit the movement of a small animal between cubicles, formed by the intersection of grid elements 70, with each other.

Referring again to FIGS. 1 and 2, the present embodiment shows maze elements 12a–c as placed inside of the containment structure 10 horizontally although a vertical arrangement could be contemplated.

A planar structure 11 is inserted between maze elements 12 inside containment structure 10 to separate said maze elements. The apertures 16 of planar surface 11 are essentially of the same size and shape as apertures 14. Planar surfaces 11 may have one or more of said apertures in any cubicle defined by the position of intersecting grid elements 70. Ideally, the apertures 16 of two adjacent planar surfaces 11 will not be located in the same position with respect to the containment structure. Variation in the maze pattern may be accomplished by interchanging planar surfaces 11 with different hole patterns or by rotating identical planar surfaces 11 with asymmetric hole patterns 90°, 180°, or 270° with respect to one another when placing said planar surfaces 11 between maze elements. The apertures 16 permit passage of a small animal between levels of maze elements 12a, 12b and 12c.

FIG. 3 presents a modular unit of the three-dimensional maze for small animals. Any number of box modules 20 may be stacked one on top another to form a containment structure similar to structure 10 in FIG. 1. Box module 20 is composed of a bottom planar surface 22 and four sides: 24a, 24b, 24c and 24d. Apertures 28a and 28b serve as access for the small animals between maze elements. Box module 20 may have at least one aperture such as 34a or 34b which permits access in and out of the maze by small animals. The apertures may vary in number, size and position and are shown here as round in shape but could essentially be cut to any geometric pattern. Again, rotation of identical modules before stacking results in varying aperture locations.

In stacking box modules 20, a secure fit is accomplished by introducing connecting means 30 located on the upper corner surface of one module 20 into the corresponding notch 32 on the bottom corner surface of a second box module 20.

Advantageous but not necessary are the grid guides 26 appearing on the inner surfaces of sides 24a, 24b, 24c and 24d where grid elements abut. These grid guides 26 serve to add stability to the maze element and assist a person in arranging the grid elements. Such grid guides 26 may be used with any of the proposed embodiments of the present invention.

FIG. 5 illustrates still another embodiment of the present invention. In this embodiment, containment structure 40 is a knockdown structure, cubical in shape and open at one end, although the containment structure 40 could be made into any geometric shape. The containment structure 40 is formed by a number of planar surfaces 48a, 48b, 48c and 48d and a bottom planar surface 41, collectively referred to as planar sides, which are all held together by a framework. The containment structure may have an optional top planar surface 45.

The vertical planar surfaces 48a–d, and bottom planar surface 41 shown in FIG. 5C are conventionally molded or manufactured from a rigid sheet material similar to the material used in the construction of the containment structure and planar surfaces previously discussed. The planar surfaces 48, shown here as essentially rectangular in shape, could be manufactured in a number of geometric shapes to fit a corresponding containment structure. The apertures 43 in the planar surfaces 48 permit access in and out of the maze by small animals. The apertures may vary in number, size and position and are shown here are rounded in shape, but could essentially be cut in any geometric pattern.

The framework is made of a series of strips, preferably manufactured out of plastic or metal. Crosssections of the framework as shown in FIGS. 5A and 5B, illustrate that each strip has a groove which runs the entire length of the strip, the diameter of which matches the thickness of the planar surfaces 48. This allows the planar surfaces 48 to be fitted into the grooves of the strip material with enough resistance to hold the surfaces in the grooves until pulled apart. The top and bottom rim pieces 42a–d and 44a–d as shown in FIG. 5, are shaped to fit the upper and lower perimeters of the containment structure 40. Three of the four rim pieces 42b–d and 44b–d include a flange 52 facing inward. The fourth side of rim pieces 42a and 44a contain no flange 52, thereby allowing a top planar surface 45 or bottom planar surface 41 to be slid over rim pieces 42a or 44a and into another groove created by flange 52 on rim pieces 42b–d and 44b–d and held in place with a friction fit.

As shown in FIG. 5, the bottom rim pieces 42a–d connect the vertical planar surfaces 48a–d, such that they are perpendicular to the bottom surface 41, and hold the planar surfaces together at essentially right angles to one another. The top rim pieces 44a–d essentially hold the vertical planar surfaces 48 together at right angles. Side rim pieces 46a–d, also composed of strip material, are optional but when used serve to hold together two adjacent vertical planar surfaces.

The grid elements 70 as illustrated in FIG. 4 are molded or manufactured from rigid sheet material, similar to those discussed with respect to the containment structure 10 and planar surfaces. The preferred embodiment shows the grid elements 70 as essentially rectangular in shape. Each grid element is essentially divided into sections 74 by a plurality of slots 76. The slots 76 have a width essentially equal to the thickness of a corresponding grid element and a length approximately equal to one-half the height of the grid element. A grid element 70 may have at least one aperture 18 which may be located in any section. The apertures are similar in size and shape to those in the containment structure 10 and the planar surface 11. The grid elements are combined and thus a maze element formed, by lining up a number of grid elements 70 in parallel fashion and with all slots 76 facing upward. Then, other grid pieces 70 are dropped across the first set in a perpendicular direction and with all slots 76 facing downward so that the upward-facing slots interlock with the downward facing ones. The grid may be full and complex or partial and more open, with some slots unused. The level of complexity will also be affected by choosing individual grid elements with fewer or more apertures.

Virtually any element of the present invention described above could have optional ventilation holes 13 cut therein for the purpose of permitting air from outside the containment structure 10 to penetrate the structure. These ventilation holes 13, shown in FIG. 5c, may be of any geometric shape but are of a size substantially smaller than any small animal which could occupy the maze.

While in accordance with the patent statutes the best mode and preferred embodiment of the invention has been described, it is to be understood that the invention is not limited thereto, but rather is to be measured by the scope and spirit of the appended claims.

What is claimed is:

1. A three-dimensional maze for small animals comprising:
    a containment structure with at least one open end for accessing maze elements and cleaning, and at least one aperture large enough to accommodate the passage of a small animal;
    a plurality of maze elements encased in said containment structure, said maze elements further comprising a plurality of grid elements, said grid elements containing an indeterminate number of apertures large enough to accommodate a small animal;
    a first means for altering the maze wherein the grid elements are interchanged; and
    a plurality of planar surfaces which separate the maze elements.

2. The maze of claim 1 wherein the grid elements further include slots for interlocking with each other.

3. The maze of claim 1 wherein the planar surfaces possess an indeterminate number of apertures large enough to accommodate a small animal, and further including a second means for altering the maze wherein the planar surfaces are rearranged by at least one of the methods consisting of interchanging and rotating.

4. The maze of claim 1 further including at least one removable cover.

5. The maze of claim 1 wherein the containment structure further includes a guiding means to assist in placement of the grid elements.

6. The maze of claim 1 wherein the containment structure is a rigid box.

7. The maze of claim 1 wherein the containment structure and planar surfaces further comprise:
    a plurality of stacking modular units with an indeterminate number of apertures large enough to accommodate a small animal;
    a third means for altering the maze wherein the modules are rotated with respect to each other; and
    a means for connecting said modular units together.

8. The maze of claim 1 wherein the containment structure is a knockdown structure.

9. The maze of claim 8 wherein the knockdown structure further comprises a plurality of planar sides and a means for securing said sides together.

10. A three-dimensional maze for small animals comprising:
    a containment structure with at least one open end for accessing maze elements and cleaning, and at least one aperture large enough to accommodate the passage of a small animal;
    a plurality of maze elements encased in said containment structure, said maze elements further comprising a plurality of grid elements, said grid elements containing an indeterminate number of apertures large enough to accommodate a small animal;
    a first means for altering the maze wherein the grid elements are interchanged; and
    a plurality of planar surfaces which separate said maze elements and which further include an indeterminate number of apertures large enough to accommodate a small animal; and
    a second means for altering the maze wherein the planar surfaces are rearranged by at least one of the methods consisting of interchanging and rotating.

11. The maze of claim 10 wherein the grid elements further include slots for interlocking with each other.

12. The maze of claim 10 further including at least one removable cover.

13. The maze of claim 10 wherein the containment structure further includes a guiding means to assist in placement of the grid elements.

14. The maze of claim 10 wherein the containment structure is a rigid box.

15. The maze of claim 10 wherein the containment structure and planar surfaces further comprise:
    a plurality of stacking modular units with an indeterminate number of apertures large enough to accommodate a small animal;
    a third means for altering the maze wherein the modules are rotated with respect to each other; and
    a means for connecting said modular units together.

16. The maze of claim 10 wherein the containment structure is a knockdown structure.

17. The maze of claim 16 wherein the knockdown structure further comprises a plurality of planar sides and a means for securing said sides together.

* * * * *

UNITED STATES PATENT AND TRADEMARK OFFICE
CERTIFICATE OF CORRECTION

PATENT NO. : 4,953,502

DATED : September 4, 1990

INVENTOR(S) : Judith L. Hoover

It is certified that error appears in the above-identified patent and that said Letters Patent is hereby corrected as shown below:

ON TITLE PAGE:
In [56] References Cited, change "Hall.....372/153 R" to
--Hall.....273/153 R--.

Signed and Sealed this

Thirty-first Day of December, 1991

Attest:

HARRY F. MANBECK, JR.

Attesting Officer

Commissioner of Patents and Trademarks